(12) United States Patent
McKelvey et al.

(10) Patent No.: US 8,966,403 B2
(45) Date of Patent: Feb. 24, 2015

(54) CLASSIFICATION TOOL

(75) Inventors: Scott Curtis McKelvey, Wichita, KS (US); Dan Robert Underwood, Wichita, KS (US); Guohua Jiang, Wichita, KS (US)

(73) Assignee: Textron Innovations, Inc., Providence, RI (US)

( * ) Notice: Subject to any disclaimer, the term of this patent is extended or adjusted under 35 U.S.C. 154(b) by 1328 days.

(21) Appl. No.: 11/868,360

(22) Filed: Oct. 5, 2007

(65) Prior Publication Data

US 2009/0094542 A1 Apr. 9, 2009

(51) Int. Cl.
*G06F 3/048* (2013.01)
*G06Q 10/00* (2012.01)

(52) U.S. Cl.
CPC ........................... *G06Q 10/00* (2013.01)
USPC .......... 715/853; 715/851; 715/854; 715/780; 715/783; 707/317

(58) Field of Classification Search
CPC .............. G06F 17/30994; G06F 3/048; G06F 17/30572; G06F 17/30554; G06F 17/30864; G06F 17/30991; G06F 17/30598; G06F 17/30604
USPC ......... 715/739, 765, 780, 783, 853, 851, 854; 705/331; 707/317
See application file for complete search history.

(56) References Cited

U.S. PATENT DOCUMENTS

| 6,874,123 B1* | 3/2005 | DeStefano ..................... 715/234 |
| 7,458,034 B2* | 11/2008 | Kyoya et al. .................. 715/783 |
| 7,725,406 B2* | 5/2010 | Black et al. .................... 705/331 |
| 2005/0004894 A1* | 1/2005 | Uy et al. ........................... 707/3 |
| 2005/0119926 A1* | 6/2005 | Turetsky et al. .................. 705/8 |
| 2008/0228628 A1* | 9/2008 | Gotthelf et al. ................. 705/37 |

OTHER PUBLICATIONS

Classops Insight ("Insight") © 1998, pp. 1-2).*
Cars.com ("Cars" Figures 1-3 © 2006).*
cars.com (Figures 1-3 copyright 2006).*

* cited by examiner

*Primary Examiner* — Omar Abdul-Ali
*Assistant Examiner* — Sherrod Keaton
(74) *Attorney, Agent, or Firm* — Lathrop & Gage LLP (57) ABSTRACT

Disclosed is a method which, in one embodiment, enables a user to navigate the Harmonized Tariff Schedule (HTS). The method initially involves uploading a delimited HTS file, and using it to create a wizard which optionally allows the user to navigate a series of options menus, or alternatively, the entire menu hierarchy can be displayed on the same screen. The selections made at every menu is saved for future reference. The method also optionally enables the documentation of Export Control Classification Numbers, which are recorded along with applicable control information for the product.

1 Claim, 12 Drawing Sheets

Key Word Search silicone steel bolt pump — Search — 402

404

| Category | Hits | silicone | steel | bolt | pump |
|---|---|---|---|---|---|
| 2318 | 2 | | stainless steel | bent bolts structural bolts track bolts | |
| 7415 | 2 | | steel steel bases | yellow metal bolts | |
| 8516 | 2 | | | | pump |
| 9503 | 2 | | | bolt action captive bolt humane killers | pump action |
| 0709 | 1 | | | | pumpkins |
| 1209 | 1 | | steel | | pumpkin |
| 2618 | 1 | | steel | | |
| 2619 | 1 | | steel | | |
| 2620 | 1 | | | | |
| 2710 | 1 | | | saybolt universal viscosity at 37.8 degrees c | |
| 3403 | 1 | | | bolt | |
| 3910 | 1 | silicones | | | |
| 5911 | 1 | | | bolting cloth | |
| 7204 | 1 | | alloy steel stainless steel | | |
| 7205 | 1 | | alloy steel | | |
| 7206 | 1 | | nonalloy steel | | |
| 7207 | 1 | | nonalloy steel | | |
| 7208 | | Flat-rolled products of iron or nonalloy steel, of a width of 600 mm or more, hot-rolled, not clad, plated or coated | | | |
| 7209 | 1 | | high-strength steel nonalloy steel | | |
| 7210 | 1 | | high-strength steel | | |

Import Compliance

Category: 7204 — 502    Calculated HTSUS
                        Current:

Question:
Ferrous waste and scrap; remelting scrap ingots of iron or steel:
— 504

Answer:
○ Waste and scrap of cast iron
○ Waste and scrap of alloy steel:
○ Waste and scrap of tinned iron or steel
○ Other waste and scrap:
○ Remelting scrap ingots

506

500

◄ Back                    Continue ► Done PreviousAnswers

CLASSIFICATION TOOL

BACKGROUND

1. Field of the Invention

The disclosures of this application relate generally to methods of classifying goods. More specifically, one embodiment of the disclosed invention is used to determine tariffs according to a classification schedule, and maintain records as to the basis for the classification made.

2. Description of the Related Art

Conventionally, tariffs are calculated according to a Harmonized Tariff Schedule (HTS). This table is available from the United States International Trade Commission (USITC). HTS comprises a hierarchical structure. This structural guide is intended to describes all goods in trade. These goods are categorized such that they can be referenced for duty, quota, and statistical purposes. The goods are broken down into 4- and 6-digit categories. These categories are then subdivided into 8-digit unique U.S. rate lines and 10-digit non-legal statistical reporting categories. Classification of goods in this system is done starting at the 4-digit heading level to find the most specific provision and then moving to the subordinate categories.

The USITC maintains and publishes the HTS both in print and on-line and has the ability to provide consumers with a delimited file which includes the most recent Schedule.

SUMMARY

The disclosed embodiments include a method of classifying an item. The method includes the steps of (i) providing a classification hierarchy, the hierarchy including a class, the class including plurality of classifications, each of the plurality comprising a hierarchy level, a dependency relationship, and a description; (ii) extracting a first group of classifications from the plurality of classifications, each of the first group of classifications existing at a first hierarchy level; (iii) presenting descriptions for each of the first group of classifications to a user; (iv) enabling the user to make a first classification selection from the first group of classifications; (v) displaying descriptions for a second group of classifications, the second group including classifications from a second hierarchy level which has a dependency relationship with respect to the first classification selection; (vi) receiving a second classification selection from the second group; and (vii) saving the first and second selected classifications for future reference.

In another embodiment, the method includes the steps of organizing the first group of selections into a first menu in the presenting step; and organizing the second group of selections into a second menu in the displaying step.

In yet another embodiment, the method comprises a step of including the first menu on a first screen and displaying the second menu upon a second screen when the second classification selection is made. In an alternative to this arrangement, the method comprises a step of including the first menu and the second menu upon a common screen, the second menu appearing on the common screen when the second classification selection is made.

In another embodiment, the method includes a a hierarchy editor. The editor process enables the user to change one of the hierarchy level, dependency relationship, and description while viewing the information in a menu format.

In another embodiment, a method of documenting classifications for products or other imports and or exports is disclosed. The documentation process involves the steps of (i) providing a user with a menu-driven hierarchy for the purpose of enabling a classification selection for one of an imported or exported thing according to a Harmonized Tariff Schedule (HTS); (ii) recording the classification selection made for the thing; and (iii) receiving an Export Control Classification identifier from the user and saving the identifier along with the classification selection for future reference. In a further embodiment of this documentation process control information for the thing is recordable along with the identifier.

In another embodiment, media is disclosed. The media, in a variety of embodiments, includes the methods discussed above.

DETAILED DESCRIPTION

Unless otherwise specified, any terms used herein should be interpreted broadly and liberally to the extent allowed by the art and the meaning of the words offered in context.

As one skilled in the art will appreciate, the present invention may be embodied as, among other things: a method, system, or computer-program product. Accordingly, the present invention may take the form of a hardware embodiment, a software embodiment, or an embodiment combining software and hardware. In a preferred embodiment, the present invention takes the form of a computer-program product that includes computer-useable instructions embodied on a computer-readable medium.

Computer-readable media include both volatile and non-volatile media, removable and non-removable media, and contemplates media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Figure 1:
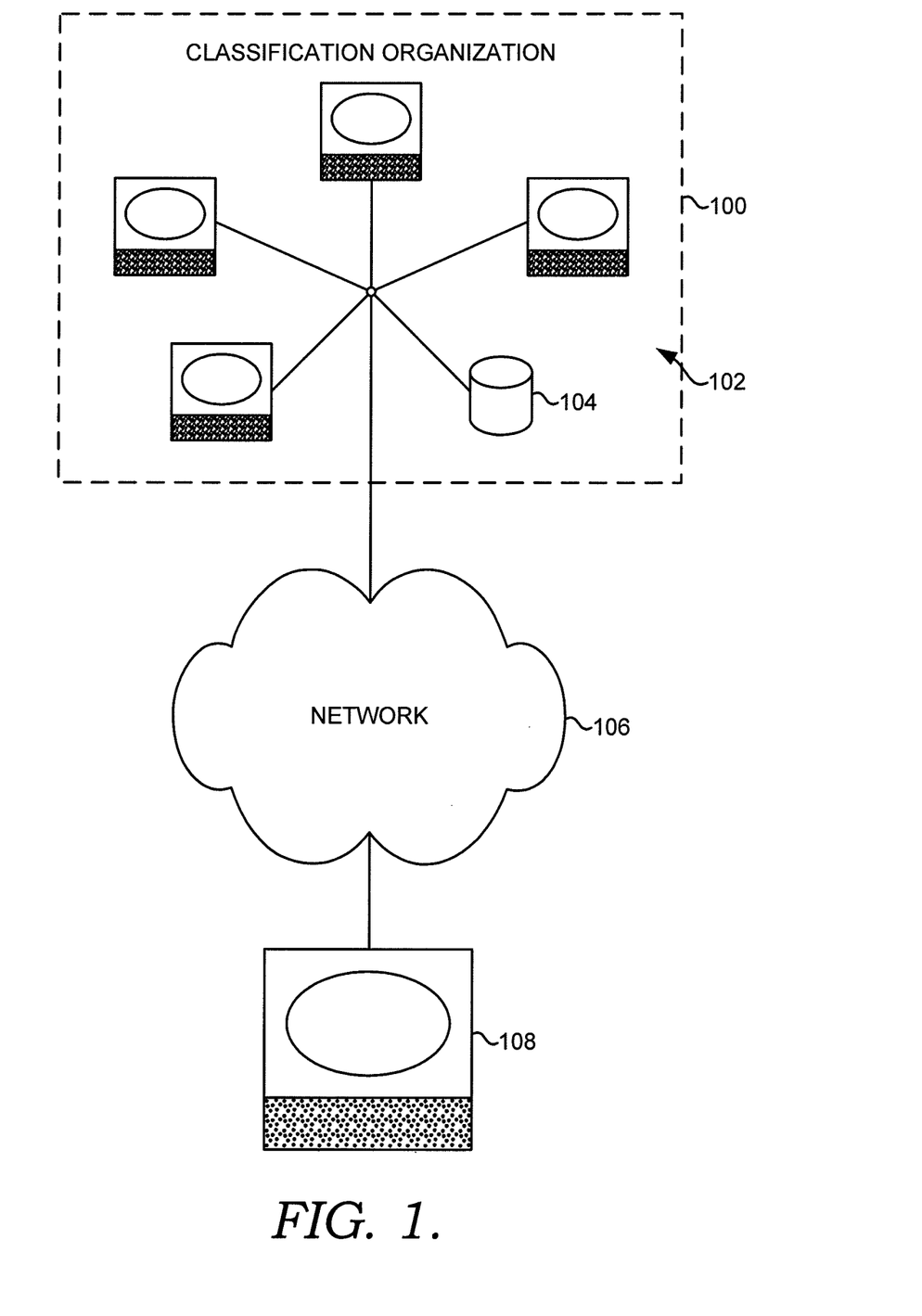
FIG. 1 illustrates a system diagram for a computing environment in which one embodiment of the disclosed processes could be performed.

An embodiment for one environment in which the disclosed processes can be executed is shown in FIG. 1. Referring the figure, it can be seen that a classifying body 100 possesses a computing system 102 having a database 104. Computing system 102 most likely would be some sort of complex arrangement, but could be as simple as a personal computer (PC). Normally system 102 and database 104 will be associated with an organization that has been shouldered with the responsibility of classifying some kinds of things for any of a number of purposes. In the embodiment disclosed in the most detail herein, classifying body 100 is a trade organization. More specifically, the trade organization is the United States International Trade Commission (USITC). But the classifying body could be any number of other organizations or entities which have the need to classify things for any number of purposes. Another government entity which uses similar classification schemes is the United States Patent and Trademark Office (USPTO). And beyond government uses, any private business with inventory has the need to classify products. Further, numerous other purposes exist which require the identification of items for one reason or another. Thus, the particulars disclosed herein are only embodiments in the much broader realm of possibilities.

System 102 exists in a network 106. Network 106 could be a wireless network, a local area network (LAN), the internet, an intranet arrangement, or any other kind of networking arrangement.

Also connected into network 106 is a user's computer system 108. Numerous processes running on user's computer 108 accomplish objectives discussed hereinafter. It should be noted that although computer 108 is shown as a mere PC, but it could, and most likely would be a more sophisticated, and possibly shared, computing system. A simple PC has been shown here as computing device 108 for simplicity sake.

In one embodiment, the processes of this invention will be used to aid a user in successfully categorizing an item under the HTS, and then document exactly what steps were taken in reaching an ultimate classification decision.

Figure 2:
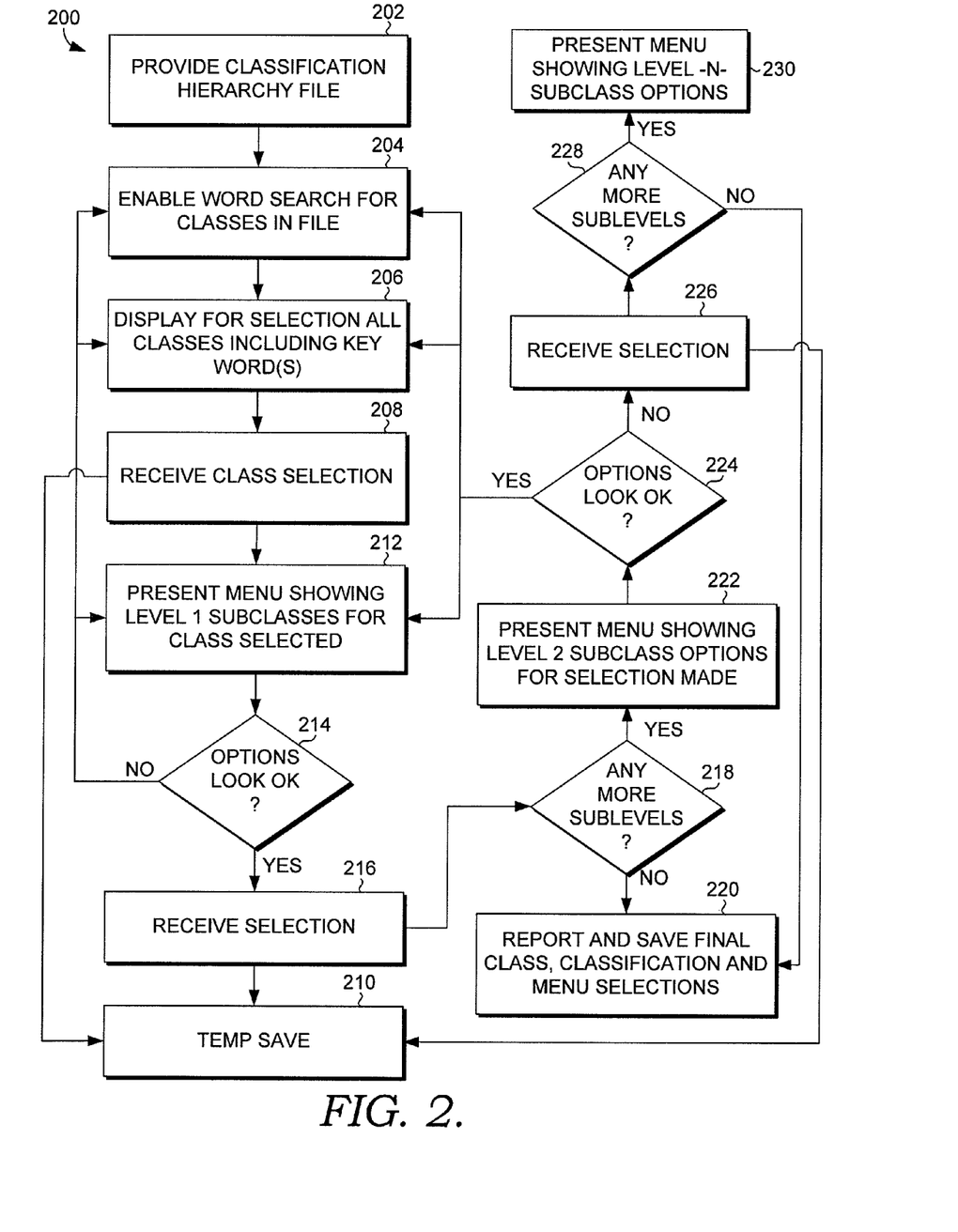
FIG. 2 illustrates a process flow diagram for one embodiment of the processes of the classification tool of the present invention.

A flow diagram illustrating one embodiment for the processes disclosed is shown in FIG. 2. Referring to a flow chart 200 shown in the figure, it can be seen that a first step 202 involves the provision of a classification hierarchy file. In one embodiment, this could be a classification hierarchy included in data files which are published regularly by some organization, e.g., classifying organization 100. The HTS published by the USITC is one example for a file which might be used. In this embodiment, the data file used is a delimited file. This kind of file might be one that is already in existence, and thus does not need to be created for the purposes of this process. For example, the USITC maintains delimited files for its own use. These files are available to the public upon request. The delimited file which will be used for illustrative purposes here is the one for Class 7204. Class 7204 provides the tariff schedules for "Ferrous waste and scrap; remelting scrap ingots of iron ore." This class is only one of thousands included in the HTS. But this single excerpt has been selected to serve as an example. The delimited file for Class 7204 in its current form is reproduced below.
7204|||0|Ferrous waste and scrap; remelting scrap ingots of iron or steel:|||||
7204.10.00|00||1|Waste and scrap of cast iron|t|Free||74¢/t|
7204.21.00|00|Text|1|Waste and scrap of alloy steel:|||||
7204.21.00|00||2|Of stainless steel|t|Free||74¢/t|
7204.29.00|00||2||Other|t|Free||74¢/t|
7204.30.00|00|||1|Waste and scrap of tinned iron or steel|t|Free||Free|
7204.41.00||Text|1|Other waste and scrap:|||||
7204.41.00|||2|Turnings, shavings, chips, milling waste, sawdust, fillings, trimmings and stampings, whether or not in bundles||Free||74¢/t|
7204.41.00|20||3|No. 1 bundles|t||||
7204.41.00|40||3|No. 2 bundles|t||||
7204.41.00|60||3|Borings, shovelings and turnings|t||||
7204.41.00|80||3|Other|t||||
7204.49.00|||2|Other||Free||74¢/t|
7204.49.00|20||3|No. 1 heavy melting|t||||
7204.49.00|40||3|No. 2 heavy melting|t||
7204.49.00|60|Text|3|Other:|||||
7204.49.00|60||4|Cut plate and structural|t||||
7204.49.00|70||4|Shredded|t||||
7204.49.00|80||4|Other|t||||
7204.50.00|00||1|Remelting scrap ingots|t|Free||74¢/t|

In this type of file, which will be familiar to those skilled in the art, different fields in each line are divided by delimiters which appear as the symbol "|." When multiple symbols appear in succession without any data between, e.g. "|||", this means that the fields there between were empty, thus, included no data.

Referring to the delimited file above, it can be seen that each line includes at least an HTS identification number, a level number, and text describing a classification option. Using the first line as an example, it can be seen that it provides the general class name, the highest level "0" which suggests it is an actual class, and the class description "Ferrous waste and scrap; remelting scrap ingots of iron ore."

Other entries include additional information. For example, line 2 of the delimited file shows the subclassification "7204.10.00" which is followed by two delimiters and then a "00" which is a suffix which is another part of the classification numbering. More specifically, this element is a Statutory Suffix value which is used to keep track of international trade balances. Immediately following the "00" after a delimiter, is a level indicator number "1." This value means that the classification is at a first hierarchy level in the class. Thus, it is one of the subcatagories immediately below the class level itself. Immediately after that (in the 7th and 8th columns) is the text identifier for the entry—the subclass description of "Waste and scrap of cast iron." Immediately after that—shown as "|t|Free||74¢/t|"—is the Rate of Duty/Tariff information for the particular classification. Because this tariff value appears at the end of the entry line, we know that it is an ultimate classification, and that there will be no more dependent entries on it.

Dependency of lines is shown in the order the delimited file is arranged. For example, because line 2 includes the "1" level indicator, we know it depends from line 1 (which has a "0" level code) because it is immediately below it. Thus, dependency is also evident from the delimited file. Thus, the delimited file entries show not only a classification number, a hierarchy level indicator, and a text description, but also include the dependency information based on which entry it immediately follows.

Looking to lines 3 and 4 of the delimited file (reproduced below) reveals that they follow the same rules, but that they also show additional rules.
7204.21.00|00|Text|1|Waste and scrap of alloy steel:|||||  [Line 3]
7204.21.00|00||2|Of stainless steel|t|Free||74¢/t| [Line 4]

For example, because it has a level indicator of "1", we know that it does not depend from the line 2 entry, but instead depends from the main 7204 classification entry of line 1. We also see that line 3 includes a "Text" indication before the level number. This is an indication that the line is text only and does not include tariff information (like line 2 did). It is also an indication that the process will have to look to the following lines in the delimited file to find tariffs and an ultimate classification. It can be seen that to get a completed classification with a tariff, more specificity will be required by moving down to line 4, which does contain tariff information ("Free" and "74¢") and also provides a complete classification, which when combined with all the general descriptions from which it depends results in a classification of 7204.21.00 Stat. Suffix 00 under "Ferrous waste and scrap; remelting scrap ingots of iron or steel: Waste and scrap of alloy steel: Of stainless steel" having a tariff of "Free" or "74¢" depending on the Rate of Duty. It can be seen that the rest of the delimited file is organized in a similar fashion.

It should also be recognized that the delimited file above, in this embodiment, would be only one file of thousands, all of which together create a comprehensive computer-useable version of the complete HTS. Thus, in embodiments, the complete HTS classification system would be provided in step 202 by receiving it onto computing device 108 from database 104 which is controlled by the classifying organization 100. This would most likely occur over network 106, which could be the internet, or some other networking arrangement.

In terms of the method of providing in step 202, the delimited files are received using some process. In one embodiment, the files are simply downloaded and then incorporated into a wizard. In one embodiment (not shown), a question-loader link is provided which will enable the user to navigate to the delimited file and automatically include the classification information in the file (e.g., hierarchy levels, dependency relationships, and written class descriptions, into a wizard arrangement. In other arrangements, this process is executed by an administrator. Regardless, a process will be used (included in step 202) which evaluates the delimited files after they are obtained from the classifying organization 100 in raw form, for errors and reliability. A common example of this type of error is the misplacement of data, e.g., including a data entry in the wrong column. This can occur as the result of misplaced, absent, or excessive delimiters. These kinds of errors are common in such files, and even in the publications from which they are derived. In one embodiment, the correction process identifies the errors by classification line number and then a user manually corrects them. The line number and/or the corrections are then saved for later reference as they may be useful in the receipt of future updates released by the classifying body which will contain the same errors unless the organization has corrected them in the interim.

By referencing the hierarchy information (e.g., levels, descriptions, dependencies) included in the error-checked and cleared delimited file which has been provided in step 202, process 200 enables a word search to be made in a step 204. One skilled in the art will know how to enable this type of search of the delimited file. The keyword may then be entered into a field in a computer-generated interface screen 300 shown in FIG. 3. It can be seen that screen 300 includes a plurality of various fields, and that one such field is a keyword button 302.

Figure 4:
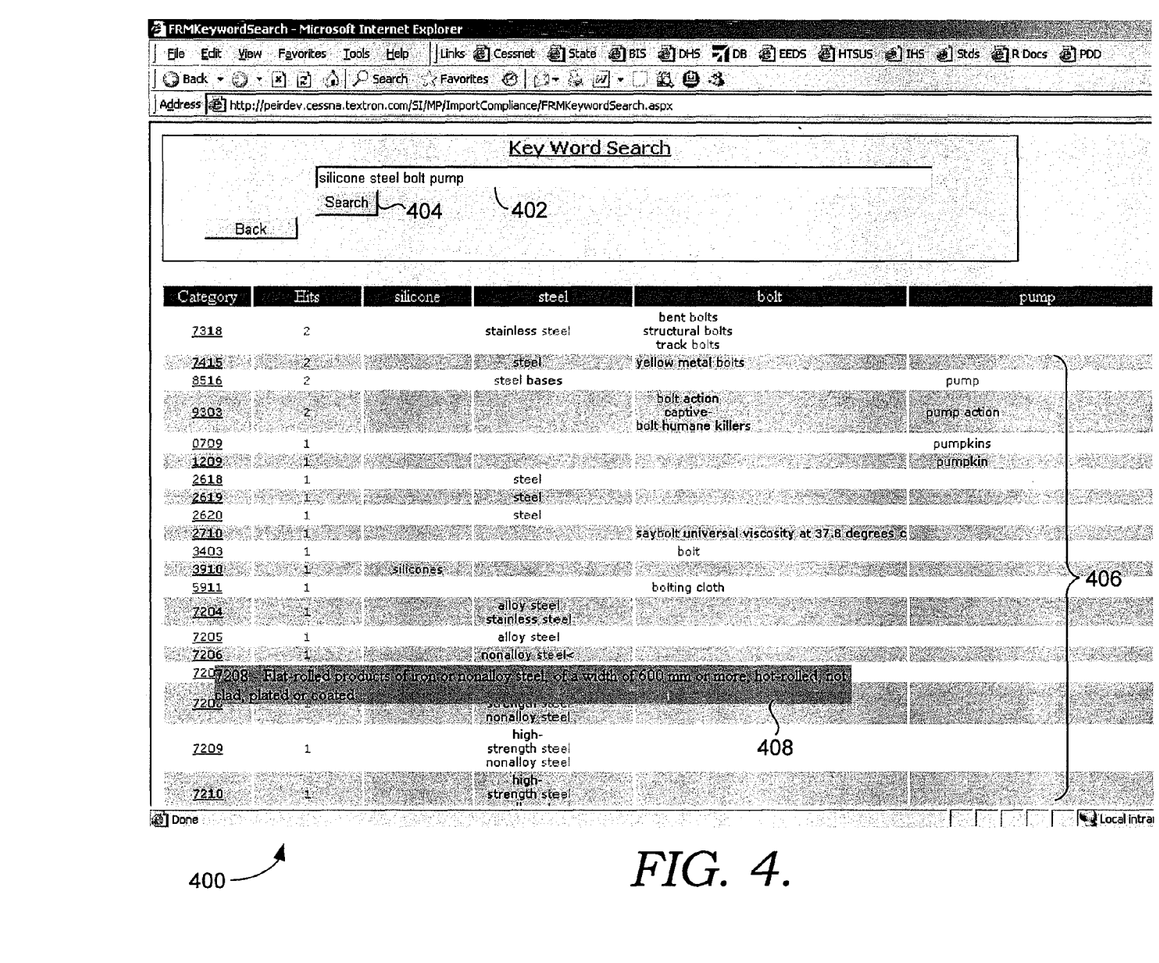

When button 302 is selected, it brings up another computer-generated interface screen 400 shown in FIG. 4. Screen 400 includes a field 402 in which one or more keywords can be entered. As can be seen in the figure, an entry of "silicone steel bolt pump" has been made. When a user hits a search button 404, the process searches the entire delimited file and brings up any keyword hits. The process in the disclosed embodiment displays the classes in which any of the entered keywords exist in a step 206 as can be seen in FIG. 4. The process could be adapted, however, to pull up only classes which include all the keywords, or adapted in some other known manner of enabling text searches known in the art. The manner in which class search hits are displayed can be seen as shown in an area 406. Under the heading "category" the actual class is displayed for each hit in the leftmost column. In the next column, the number of hits is displayed, and after that, each of the individual keywords is shown in the table heading, and the context for each hit shown below. The context provided for each hit is helpful enabling a user to select a particular class as a first step to creating a classification. Another helpful feature is a mouse-over display process. This process is triggered when a user positions the mouse arrow over the link selection for a class of interest, but does not yet click on/select that class. When this occurs, the process extracts the appropriate class description from the delimited file (see Line 1 above) and presents the description in a pop-up box 408 which appears and gives the user the full class description. This mouse-over feature enables the user to obtain the descriptions without having to go to another interface screen.

After a class selection is made by a user and received by the process in a step 208, the process extracts the appropriate list of level 1 options from the delimited file. Referring back the delimited file above, this means the process extracts only the class entries which include a level "1" identifier—entries (i) 7204.10.00|00| in line 2; (ii) 7204.21.00|00| in line 3; (iii) 7204.30.00|00| in line 6; (iv) 7204.41.00|00| in line 7; and (v) 7204.50.00|00| in line 21 (the last line in the delimited file).

Immediately upon selection of a particular class option in step 208, the selection made is saved in a step 210. This saved information will be used to record the class selected for future reference. The selection will also, in one embodiment, direct the user back to screen 300 in FIG. 3 where a field 304 will automatically be populated with the appropriate classification. At this point, the user will be able to select one of two alternative ways to select a proper classification. One is menu driven, and the other is form driven.

Figure 3:
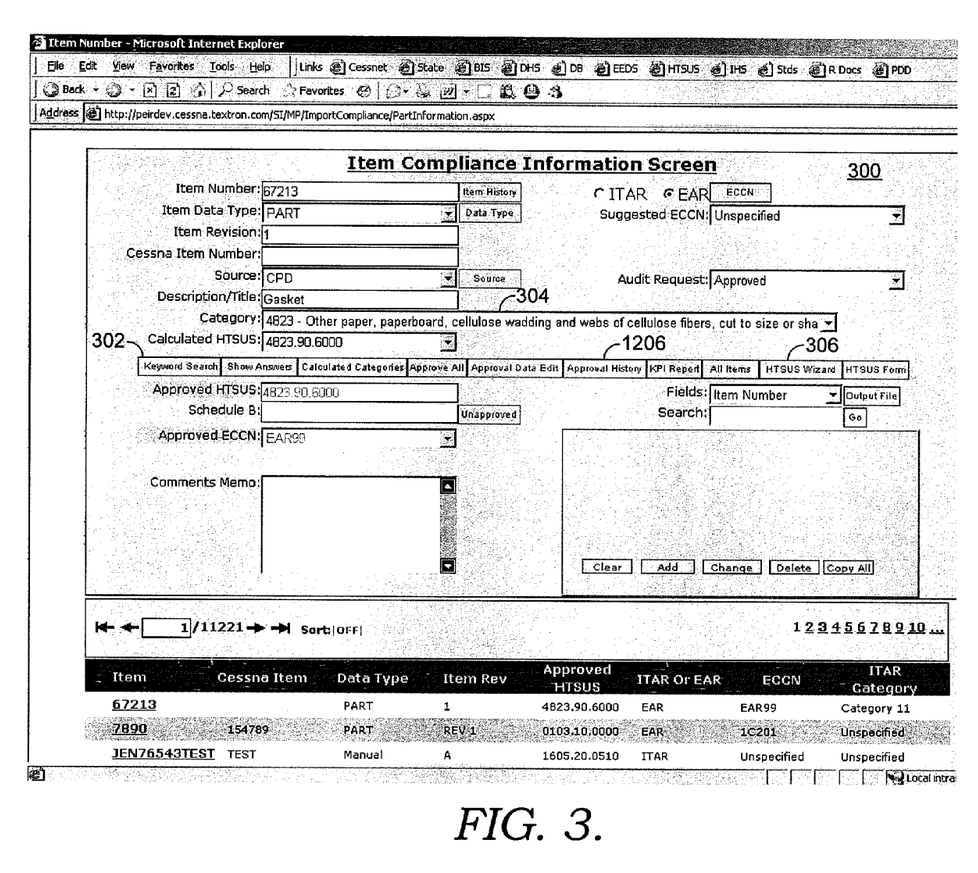
FIGS. 3-12 illustrate embodiments for computer generated user interfaces for receiving and displaying information in accomplishing the processes of the disclosed methods.

The FIG. 2 process 200 presumes a selection of the menu driven option by clicking on an "HTSUS Wizard" button 306 on screen 300. This selection will result in a menu display like that shown in FIG. 5. An alternative form-driven option is functionally similar, but includes a different display process.

Figure 5:
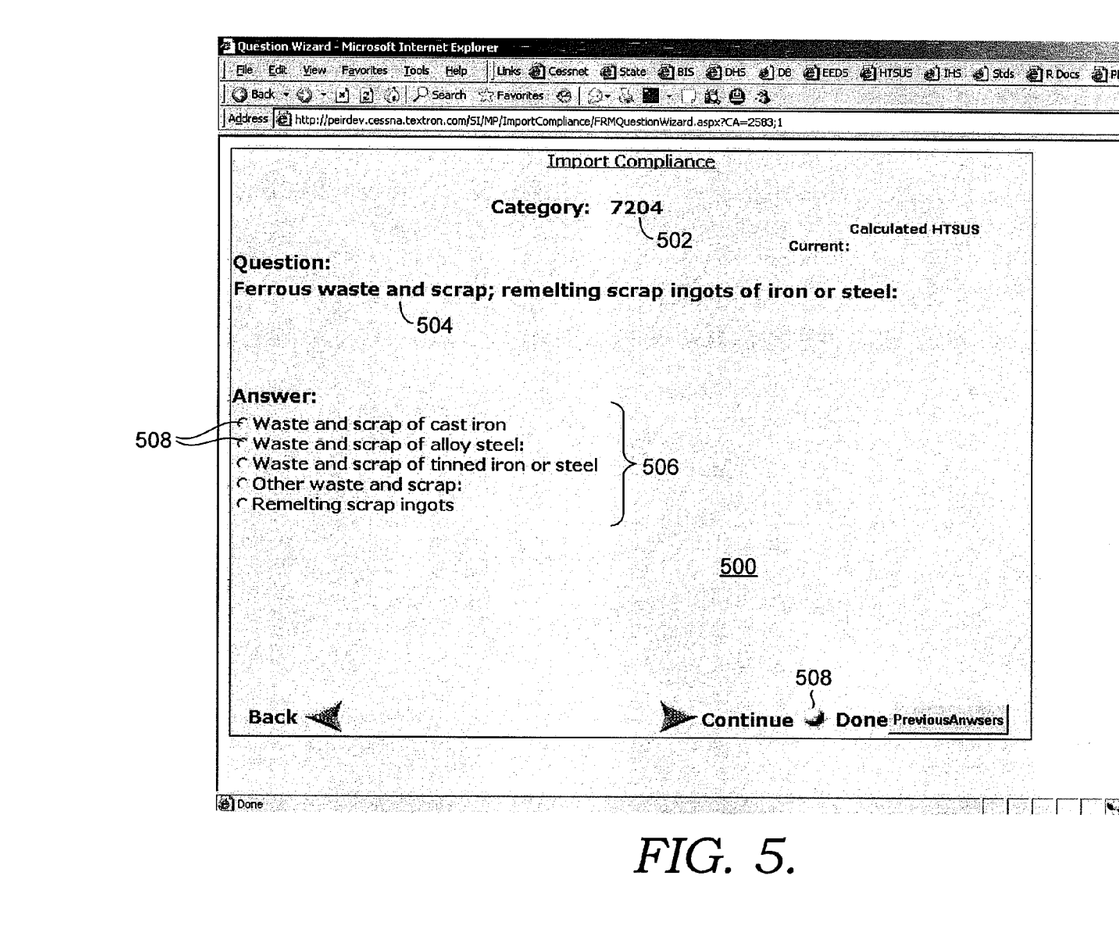

In a next step 212, the descriptive text for all the level 1 classification options for the class selected (7204 here) are extracted from the delimited file and then presented in a menu as seen in FIG. 5. More specifically, in the preferred embodiment, an interface screen 500 shown in FIG. 5 includes a class number 502 under the heading "[c]ategory," a class description 504 ("[f]errrous waste and scrap; remelting scrap ingots of iron or steel" for Class 7204) underneath the heading "[q]uestion," and an options menu 506 under the heading "[a]nswer." Thus, the user is able to see the class for which the level 1 options are being displayed along with the further options. Options menu 506 includes a plurality of selectable options 508.

Thereafter, process 200 moves on to a step 214, wherein, once the user has viewed options menu 506, the user determines whether any of selections 508 displayed appear appropriate in consideration of the particular article/item being classified. If none of the options listed appears to be appropriate, the user may redirect the process back to previous screen 400 using the "Back" button on the page. In the process shown in FIG. 2, this step is shown as a loop back to process step 206. Alternatively, the user could instead loop all the way back to process step 204 and perform another word search. This can be done by hitting the "Back" button twice to back the menu-driven process out to the search screen 400, and then entering a new search term (or terms).

Figure 6:
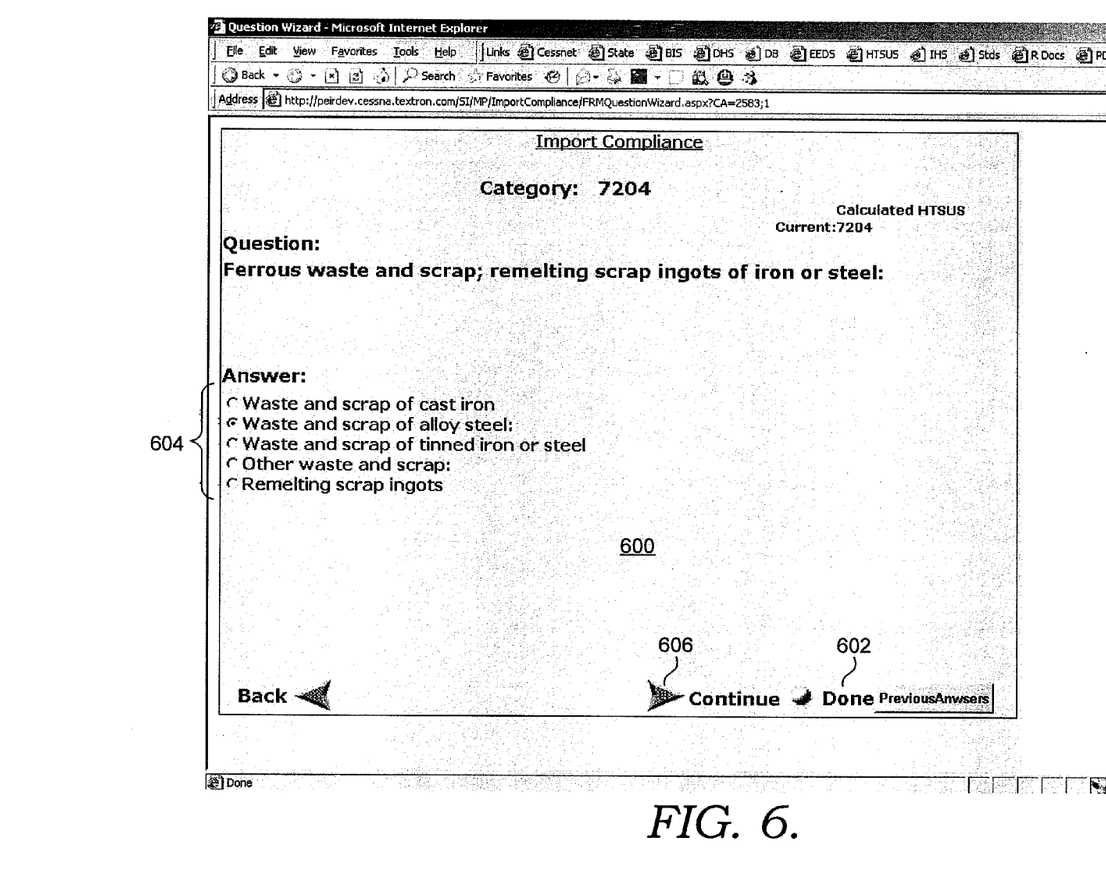

If any of the options presented looks okay, the user can then make a selection as shown in FIG. 6. A screen 600 in FIG. 6 shows that the user has selected the option of "[w]aste and scrap of alloy steel." This is done by the user simply pointing and clicking on a selection field 604 next to the proper description, and then hitting a continue button 606 at the bottom of the page. Once this selection is received in a step 216, the process will save this level 1 subclassification selection in step 210. Thus, both the current class and subclass selections are recorded.

In some instances there will be no further sublevels of options presented. In such circumstances, this will be evident from the screen displayed. Process step 218 accounts for this situation by enabling a determination of whether there are any more sublevels of sub classifications available. If not, and assuming the user is still satisfied with all the selections made, the classification, as well as all the selections made in reaching that classification can be reported and saved as the final version in a step 220 by hitting a "done" button, see, e.g., button 510 in FIG. 5. This save and documentation process will be discussed in more detail hereinafter. In the embodiment shown here in FIGS. 3-7, however, there are more sub-selection levels still to go, and thus, the answer to query step 218 is "yes" and the process moves onto a step 222.

Figure 7:
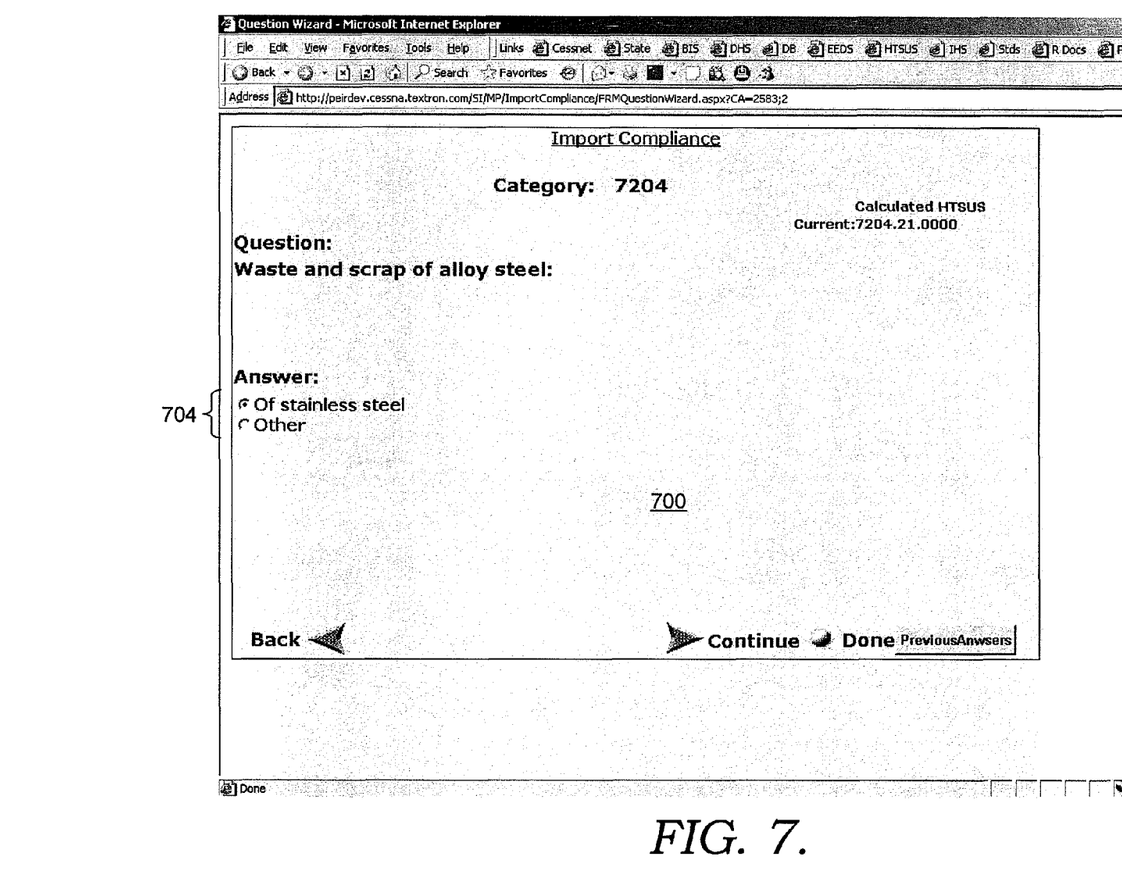

In step 222, the process displays a menu which shows the level 2 subclasses which depend from the level 1 subclass ("[w]aste and scrap of alloy steel") selected in step 216. FIG. 7 shows a new computer-generated interface screen 700 which would be presented to a user in this step. As can be seen, the only two possible selections are "[o]f stainless steel" and "[o]ther." These are the only two subclassifications which depend from the level 1 subclass above them, and thus, the user must select from them or decide, in a next step 224 that none of the selections are appropriate in consideration of the particular article/item being classified. If none of the options listed appears to be appropriate, the user may redirect the process back to previous screen 600 (level 1 menu) using the "Back" button on that page, press the "Back" button twice to get to screen 400 (the class keyword search results screen) or hit the back menu three times to get back to initial screen 300 so that a completely new word search could be done. In FIG. 2, these return options are represented as a loop originating from query step 224, and pointing to each of steps 204, 206, and 212.

If one of the selections looks like a good fit for the item being classified, however, query step 224 directs the process to a next step 226 in which the process receives a selection from the user. The selection is immediately saved in a step 210. In screen 700 it can be seen that the selection "[o]f stainless steel" has been selected. Once this selection has been made by hitting the "Continue" button at the bottom of the screen, the process moves on to a query step 228 in which a determination is made as to whether there are any level 3 sublevels classification options which depend from the level 2 selection ("[o]f stainless steel") made in interface screen 700.

If there were any such sublevels, the process would move on to a step 230 in which a level 3 menu would be displayed showing all of the level 3 subclass options. It will be recognized that this is a simple repeat of the pattern disclosed for steps 212 and 222 discussed already above. And like those steps, step 230 would be followed up with (i) a query of whether the options presented look okay, (ii) a step enabling receipt of a selection, and (iii) an inquiry as to whether any more sublevels exist. And this same pattern will also repeat itself for level 4 sublevels, level 5 sublevels, and so on until there are no further depending classifications. In order to capture the concept of this repeated pattern, a Level "N" has been shown in step 230 to signify that the process is simply repeated until no more sublevels exist for the last selection made.

Figure 8:
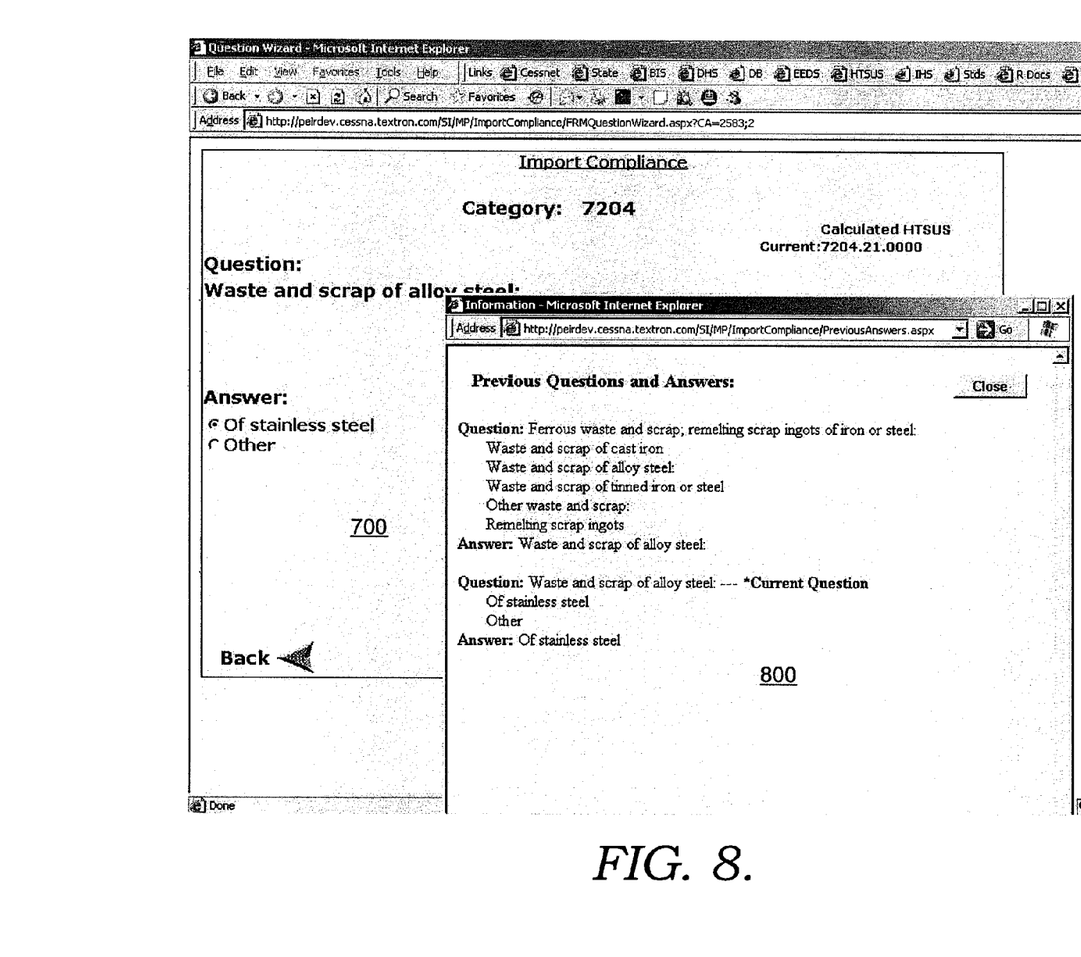

It will be seen that all of the subclass menu screens in FIGS. 5-7 include a button labeled "Previous Answers." This button can be selected at any time the user is navigating through these menus to show all of the selections made up to that point. For example, a user depressing the "Previous Answers" button on screen 700 would see the output popup screen 800 shown in FIG. 8. As will be seen, the "Previous Answers" process shows the selections made in an question and answer format. This a quick and useful way for the user to keep track of questions and answers made in the past of the same classification, which otherwise requires reliance on recollection. This may be especially difficult when a user has selected through numerous sublevels, and avoids the user having to back through the past screens to make this determination.

Figure 9:
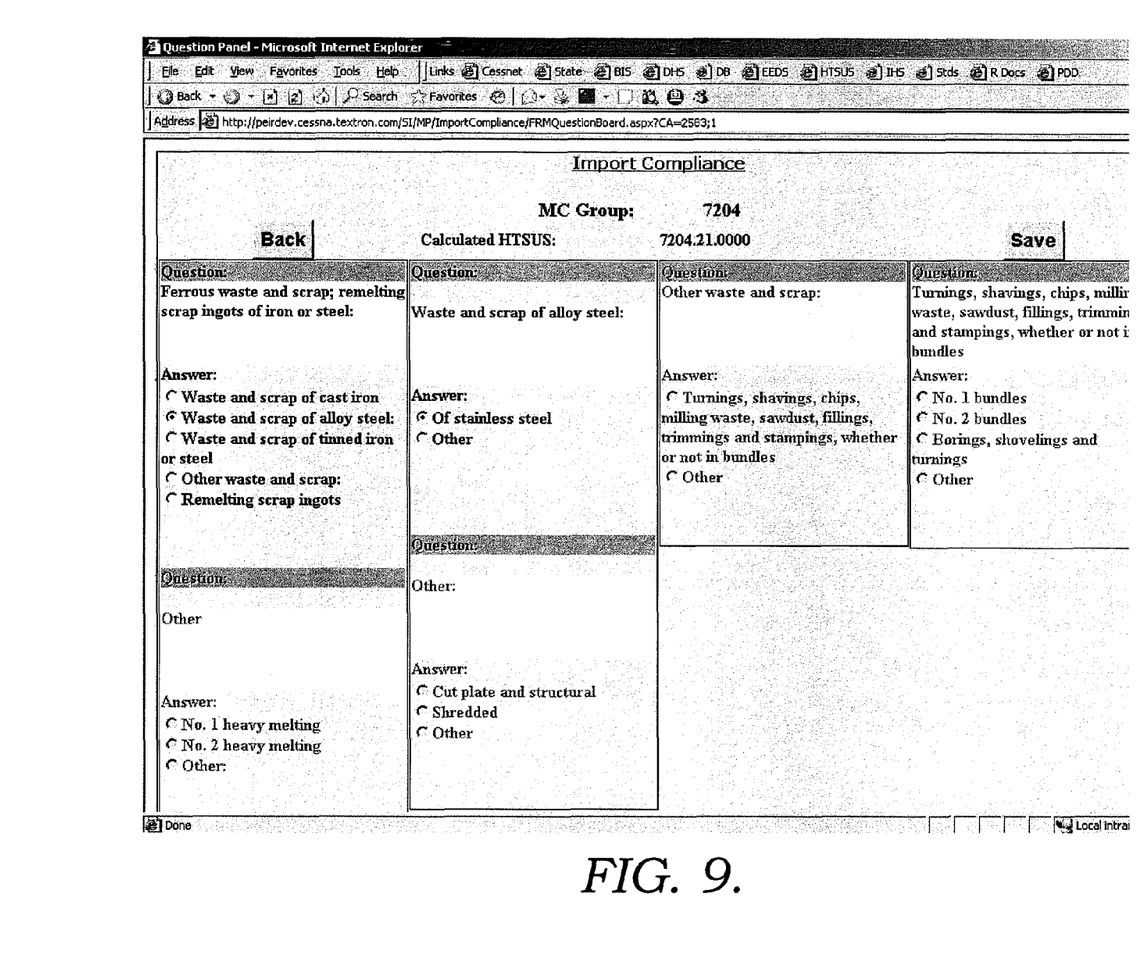

Another feature offered by the process can be seen in FIG. 9. FIG. 9 is a computer-generated interface screen which can be brought up by hitting a "HTSUS Form" button 308 on the interface screen (See FIG. 3), which is an alternative to the "USHTS Wizard" option. The FIG. 9 screen shows a classification selection made for a different HTS class (7209). FIG. 9 shows an entire listing of option selections made up to that point all on the same screen, but also offers the user to point and click to change any selections made. When any changes are made, the classifications from which that selection depended will not be changed, but any dependent selections at lower levels will be erased since the classification from which they depended has been changed. Like the "Previous Answers" feature, the user has the benefit of seeing an integrated view of the selection history, but the user is also afforded the ability to easily make changes by selecting and deselecting options. With this complementary all-on-one-screen method of displaying the hierarchy, the user is able to see much more if not all of the selections made at once. In cases like that shown in FIG. 9, the number of levels is too great to show on one screen, e.g., only four are shown. Where, like in FIG. 9, the number of option levels on the form are too many to display on one page, a horizontal automatic scrolling feature enables the user to see a great number of levels on the same screen, and as selections are made, the interface screen shifts automatically to the right to reveal the new options being displayed. Also, the user is able to horizontally adjust the portion of the form being viewed to maintain the form on one virtual screen which is only partially visible.

Figure 10:
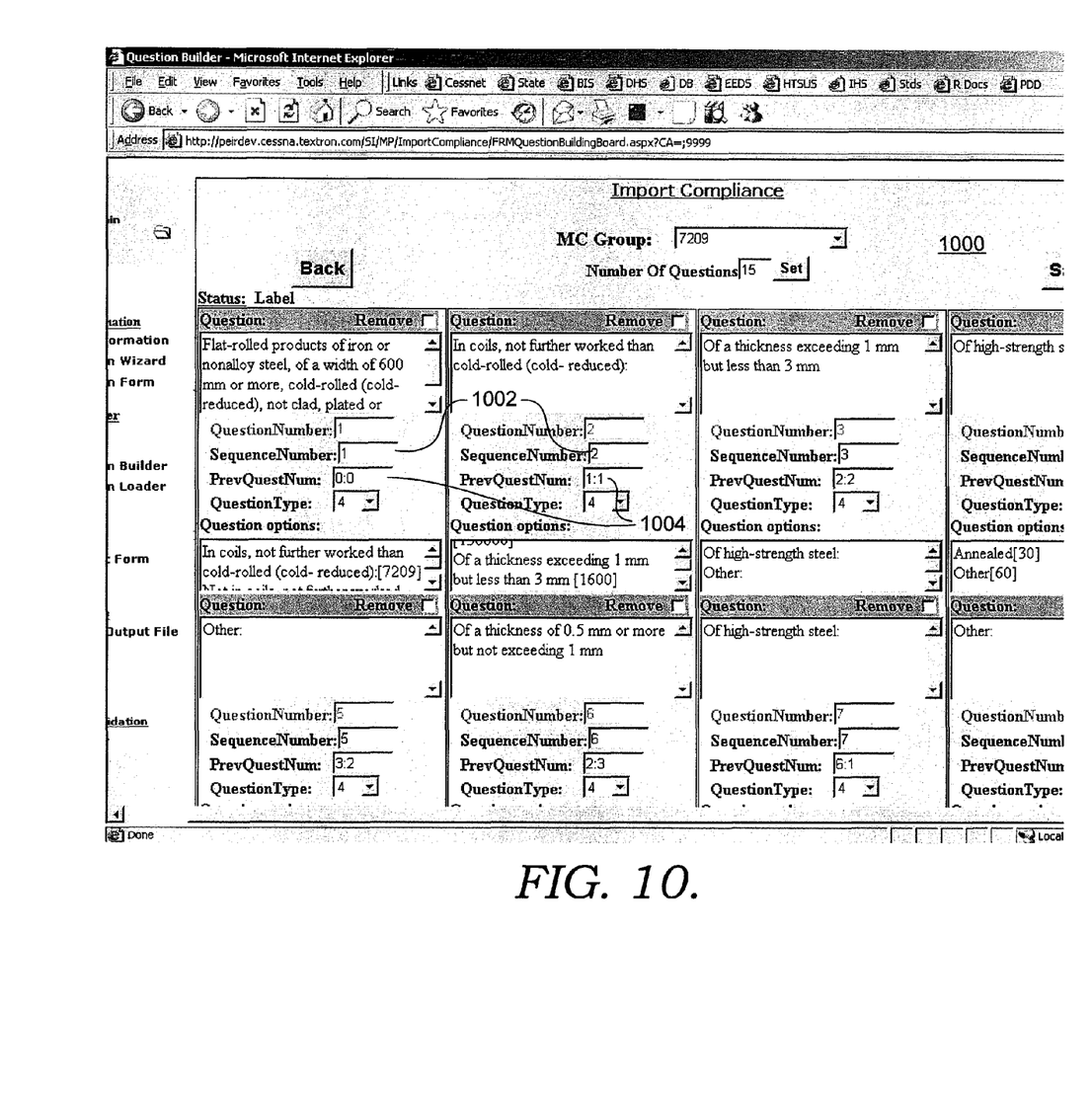

Another optional feature in one embodiment of the disclosed process is shown in FIG. 10 using a classification in class 7209 as an example. This optional process is used after the downloading process discussed above regarding step 202. After the delimited file has been accessed, and can be uploaded, the entire collection of menus is available through a computer-generated interface screen 1000 like that shown in FIG. 10. This screen enables editing and customizing the information received in the delimited files. This hierarchy-editor process enables a user to change hierarchy levels, dependency relationships, and classification descriptions while viewing the information in a menu format as shown in FIG. 10. For example, the user is able to modify the level for the particular question using a "[s]equence [n]umber" field 1002. Further, the dependency relationship for the question can be modified by editing in the "PrevQuestNum" field 1004. It will be seen that the entries into field 1004 are in the form of two numbers separated by an colon. The first number (before the colon) designates the previous question number which was selected to arrive at the current hierarchy position. The second number (after the colon) designates which option was selected for the previous question. Thus, because this field can be edited, errors in the dependency or level relationships existent in the originally received delimited file can be corrected. Further, the editor enables the user to customize the descriptions of the classes and subclasses in a plurality of editor windows 1006 provided. The existence of these modification capabilities gives the user control over file content without having to enter the text, hierarchy, or dependency information manually. It should be recognized that this part of the process is not essential, but rather an added option which might be of use in environments in which more control and easy access to delimited file content is desirable.

In embodiments, the classification tool enables the complementary documenting of Export Administration Regulations (EAR) restrictions, which are the federal regulations which specify which exports require a license from the Department of Commerce. If a product is subject to the EAR, that product might require an export license. To determine this, a determination is made as to whether an Export Control Classification Number (ECCN) fits the particular product. The government has licensing authority over the export of items that have both commercial and military applications. These items are controlled to further the national security, foreign policy, and nonproliferation interests of the United States. The five character alphanumeric ECCN identifies the technology level and the capabilities of the item. These facts, combined with the country of destination, the customer, and the intended application for the goods determines whether or not a specific license is required. Thus, the ECCN must be determined prior to shipment. And national-security as well as anti-terrorism concerns are also noted with an ECCN classification. For example, an anti-terrorism classification is "EAR99."

In one embodiment, the ECCN classification is developed practices and then simply recorded along with the HTS classifications made. Having the ECCN classification information available from a database along with the HTSUS information is valuable in that users will oftentimes desire to access past records for both classifications in compliance reviews, etc.

Figure 11:
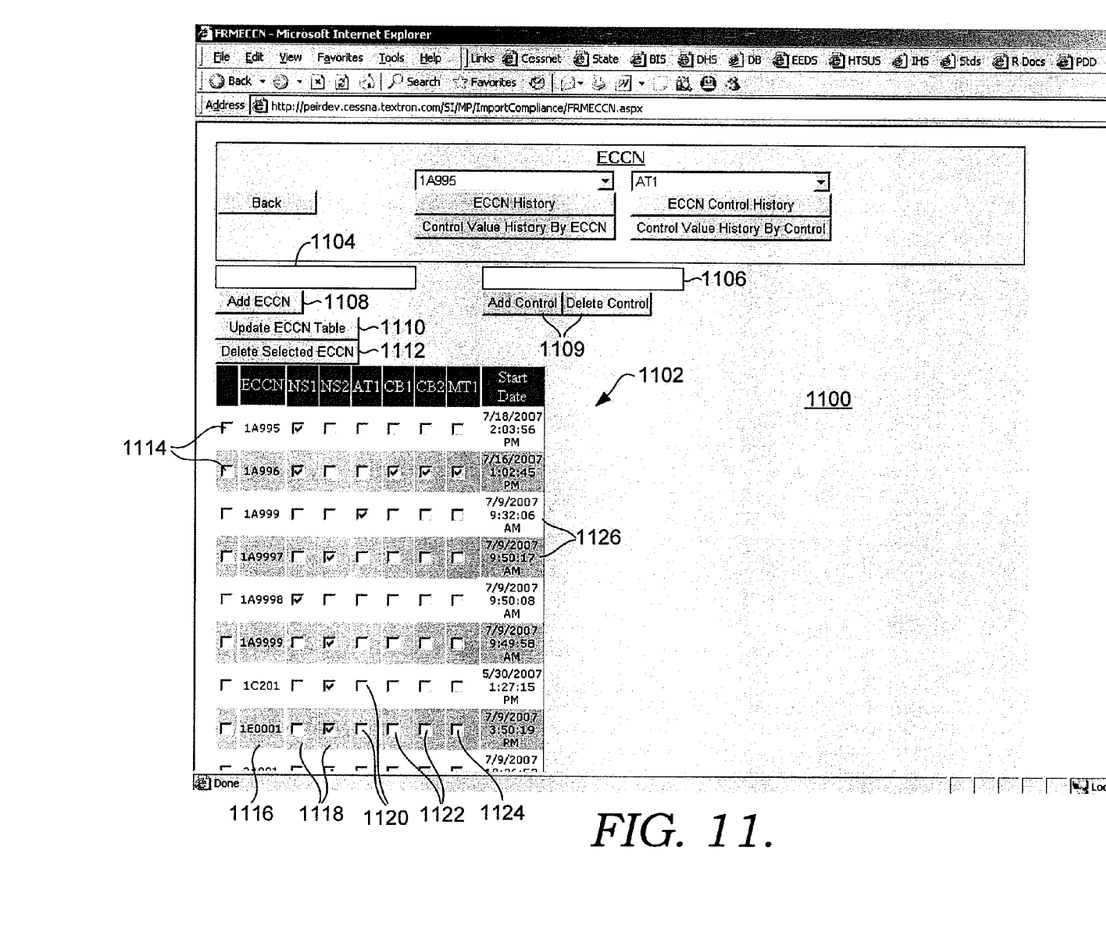

In creating an ECCN classification record, a process is provided which presents the user with a screen 1100 which includes a manually populated table 1102. A field 1104 is used to add an ECCN number. This number is obtained using conventional practices which will be known to those skilled in the art. Once the number is typed into field 1104, a user can cause it to be added to table 1102 by clicking on the "Add ECCN" button 1108. The added ECCN number then appears as a new row in an ECCN column 1116 in the table 1102. Clicking in any one of a plurality of selection boxes 1114 enables a user to delete a classification if it does not apply. After checking the 1114 box for that particular classification line, subsequent clicking on the "Delete Selected ECCN" button 1112 causes the ECCN classification to be deleted. Depressing an "Update ECCN Table" button 1110 causes the currently visible information to be saved.

Columns 1118, 1120, 1122, and 1124 all relate to international "Reasons for Control" which might exist for a particular ECCN classification. Two columns 1118 with headings "NS1" and "NS2" enable the user to indicate if national security issues exist with respect to a product classification. Similarly, column 1120 headed with "AT1" enables the user to identify and record whether there are antiterrorism issues with respect to a particular product classification. Columns 1122 headed with "CB1" and "CB2" enable the user to enter in whether chemical or biological controls exist. A column 1124 headed with "MT1" enables the user to identify if the part is controlled because it is related to missile technologies.

The "Add Control" button 1109 can be used to add unique "Reasons for Control" columns to the heading of table 1102. This can be done by simply entering the desired Reason for Control (e.g., "AT2") into field 1106, then clicking on button 1109 to create the new column. Once the new Reason for Control column is created, the user may add these to the appropriate ECCNs listed in table 1102. This is done by clicking the empty boxes in the appropriate Reason for Control column and clicking on the Update ECCN Table button (button 1110).

Figure 12:
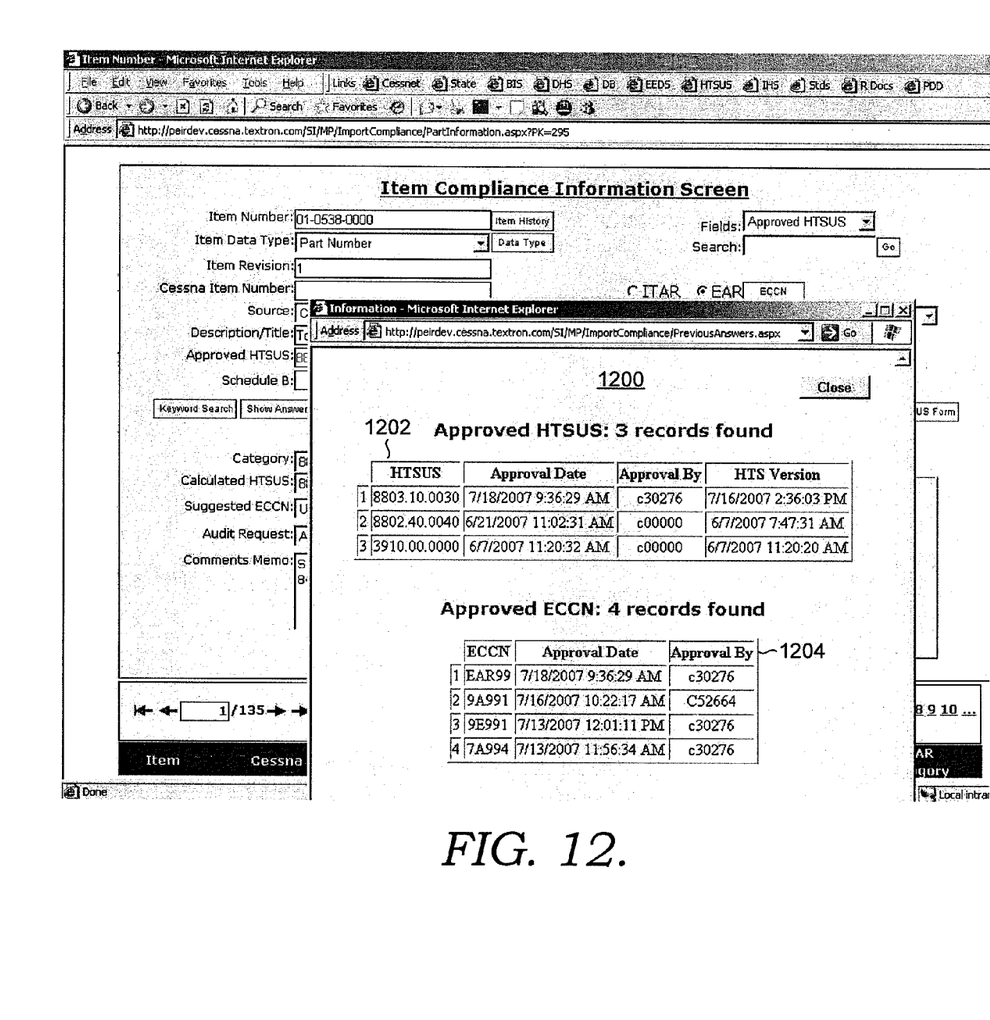

FIG. 12 shows the pop-up screen 1200. This screen is reached by clicking on the "Approval History" button 1206 (button 1206 can be seen in FIG. 3) on the Item Compliance Information Screen 300. This brings up a report displaying a history of all "Approved" classifications made for the current Item displayed. This can include the HTS, Schedule B, ECCN, or ITAR classifications as appropriate. The first line item displayed is the current classification. The Approval History is kept as a record of how the Item was classified as in the past.

It should be noted, that although the processes have been mostly embodied above in the realm of determining and documenting tariff classifications, that the disclosed embodiments are demonstrative in nature. These processes would be equally applicable in numerous other classification environments.

As can be seen, the present invention and its equivalents are well-adapted to provide a new and useful method for determining and documenting classifications. Many different arrangements of the various components depicted, as well as components not shown, are possible without departing from the spirit and scope of the present invention.

The present invention has been described in relation to particular embodiments, which are intended in all respects to be illustrative rather than restrictive. Alternative embodiments will become apparent to those skilled in the art that do not depart from its scope. Many alternative embodiments exist but are not included because of the nature of this invention. A skilled programmer may develop alternative means of implementing the aforementioned improvements without departing from the scope of the present invention.

It will also be understood that certain features and subcombinations are of utility and may be employed without reference to other features and subcombinations and are contemplated within the scope of the claims. Not all steps listed in the various figures need be carried out in the specific order described.

The invention claimed is:

1. A method of classifying an item using a computing device, the method comprising:
   obtaining a delimited file from a government agency for access by the computing device, the delimited file including a classification hierarchy, the hierarchy including a class, the class including a plurality of classifications, each of the plurality comprising a hierarchy level, a dependency relationship, and a description;
   receiving a search query from a user, wherein the search query comprises a plurality of keywords that are associated with an item to be classified;

performing a search of the plurality of classifications at a first hierarchical level within the obtained delimited file for the received search query;
identifying a first group of classifications that satisfy the search query;
presenting descriptions for each of the first group of classifications to the user;
receiving a selection of a first classification within the identified first group of classifications;
presenting descriptions for a second group of classifications at a second hierarchical level based on the received selection of the first classification, wherein the second group of classifications has a dependency relationship with the selected first classification;
receiving a selection of a second classification within the second group of classifications;
classifying the item to be classified based on the received selection of the second classification;
displaying, upon request by the user, a pop-up screen showing the selected first and second classifications in a question and answer format; and
interacting with the user to modify the selection of the first and second classifications, wherein modification results in lower level selections being removed;
wherein the question and answer format comprises a list of the hierarchy levels displayed on a single display, the list containing the selected classification at each level, a list of the dependent classifications that have a dependency relationship with the selected classification at each level, and the selected dependent classification at each level.

* * * * *